April 23, 1968 N. P. GRUCZELAK 3,379,388

REEL HOLD DOWN KNOB

Filed Dec. 30, 1966 4 Sheets-Sheet 1

INVENTOR
Norman P. Gruczelak
BY René E. Grossman
ATTORNEY

April 23, 1968 N. P. GRUCZELAK 3,379,388

REEL HOLD DOWN KNOB

Filed Dec. 30, 1966 4 Sheets-Sheet 2

United States Patent Office 3,379,388
Patented Apr. 23, 1968

3,379,388
REEL HOLD DOWN KNOB

Norman P. Gruczelak, Houston, Tex., assignor to Texas Instruments Incorporated, Dallas, Tex., a corporation of Delaware Filed Dec. 30, 1966, Ser. No. 606,316
5 Claims. (Cl. 242—68.3)

ABSTRACT OF THE DISCLOSURE

A reel holding and supporting device is disclosed which includes a hub having a flanged rear and slots included therein, said hub providing radial support for a reel. A plurality of Y-shaped holding arms are pivotally positioned in said slots and either lock a reel on said hub or push a reel off of said hub upon activation of a reel releasing means.

This invention relates to devices for holding and driving tape reels and the like, and more particularly to a device that provides a high driving torque to the reel and ease of placement of the reel upon and removal from the device.

Prior art reel holding devices generally lack the desirable combination of high driving torque and fast change of reels. This is a particular problem in digital tape transports, where, in normal practice, reels are changed often and, in operation, are accelerated and decelerated rapidly and often, all of which tends to cause slippage. This slippage problem has been overcome to some extent in the past by providing a reel holding device having prongs or other protrusions that engage slots in the reel. This approach, however, suffers from delays in loading the reel on the holding device due to possible misalignment. Means have also been devised which eliminate slots and protrusions, thus in general speeding up the loading and unloading process. However, such means still suffer from low torque characteristics.

Accordingly, it is an object of this invention to provide a reel holding and driving device which both imparts a large driving torque to the reel and enables fast engagement and disengagement of the reel from the device.

Another object of the invention is to provide a reel support and driving means which is automatically set to receive a new reel upon ejection of a previously mounted reel.

A still further object of the invention is to provide a reel holding and driving device based on a simplified design that insures great reliability combined with cost savings.

The novel features believed to be characteristic of the invention are set forth with particularity in the appended claims. The invention itself, however, as well as further objects and advantages thereof may best be understood by reference to the following detailed description when read in conjunction with the accompanying drawings wherein:

In brief, the invention provides for the automatic locking of a reel when placed on a holding knob and the release and ejection from the knob when a release buttom is pressed. After the reel is locked on the holding knob, frictional coating on the reel holding surface provides a large torque transmittal from the holding knob to the reel.

Figure 1:
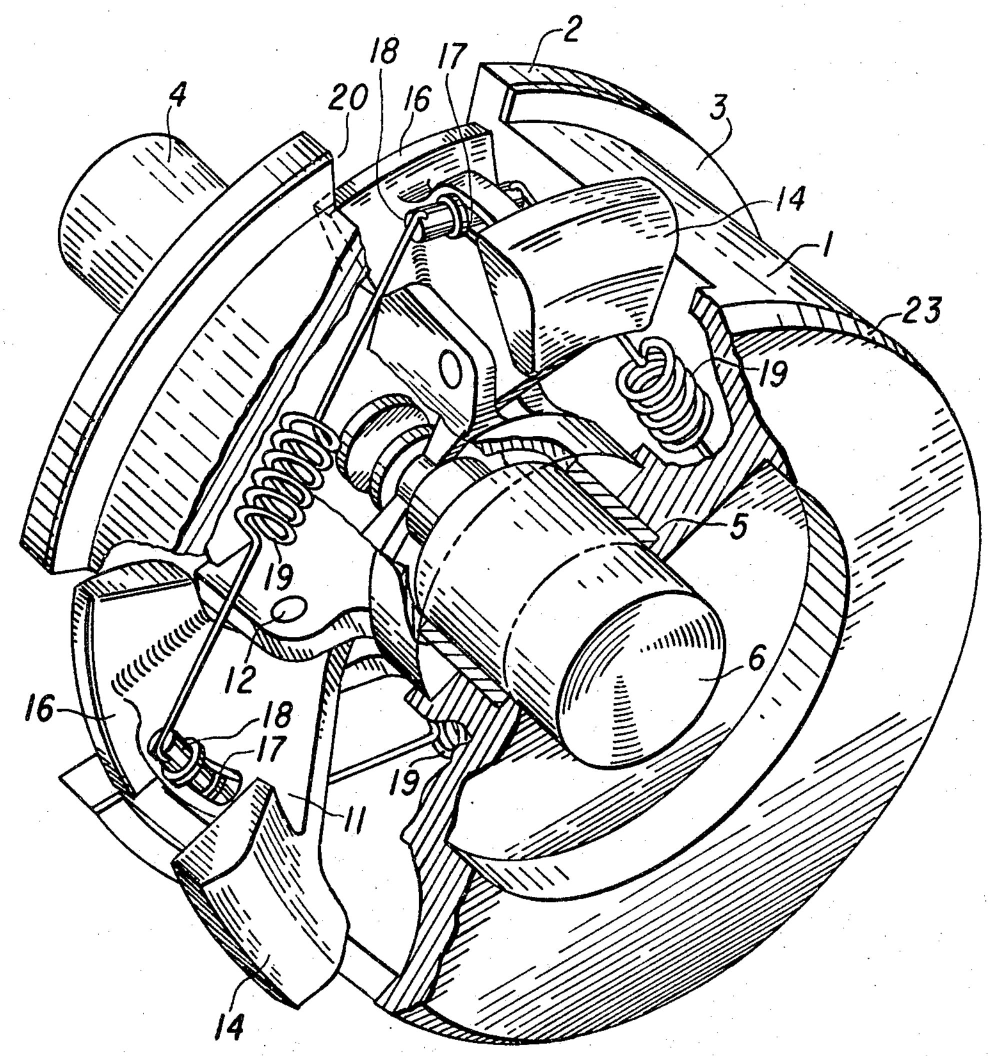
FIGURE 1 is a perspective view partially cut away, showing the tape holding and driving device according to the invention, and certain features of the internal structure of the device.
Figure 2:
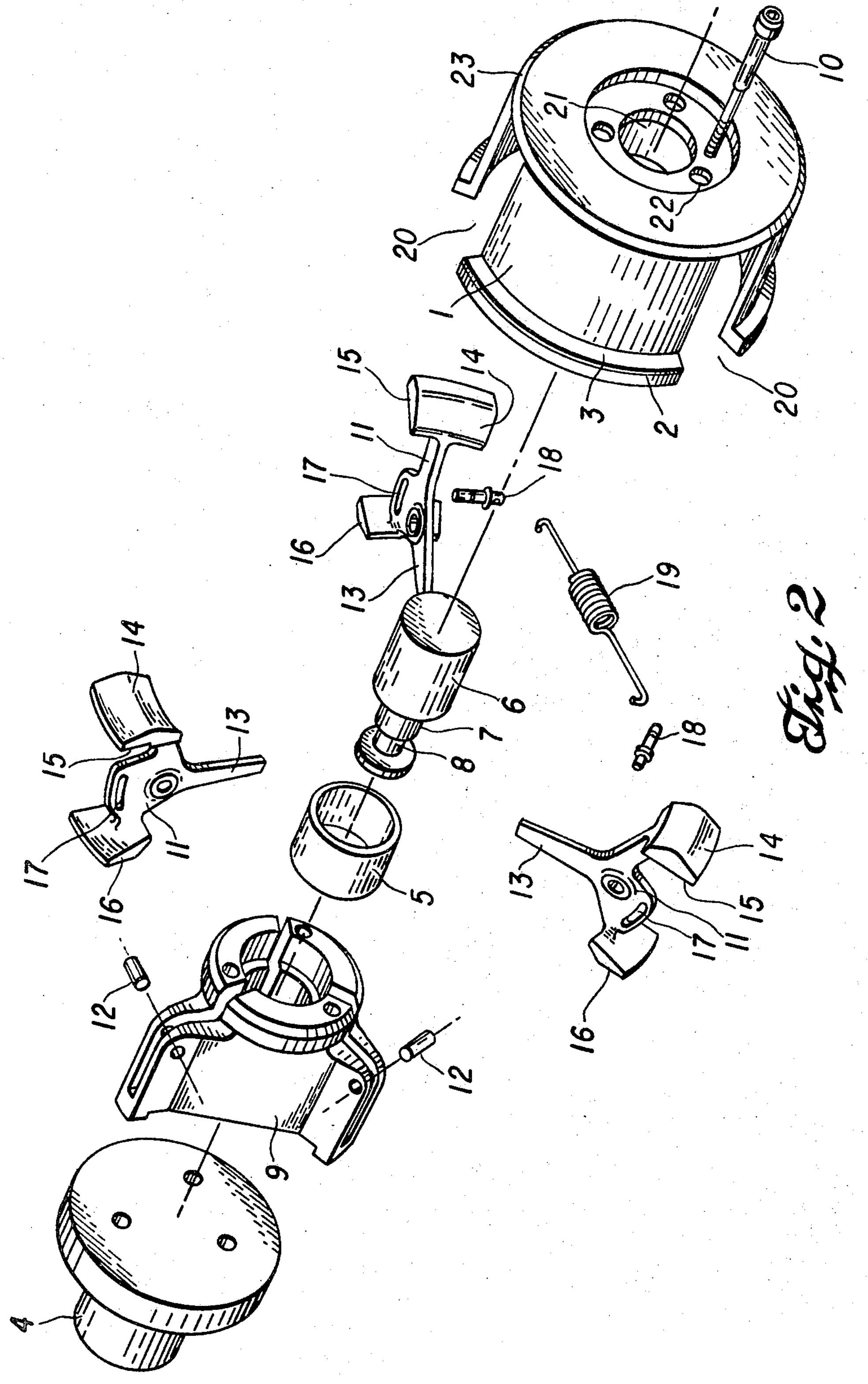
FIGURE 2 is an exploded view showing the different detached members of FIGURE 1 disposed in mounting order.
Figure 3:
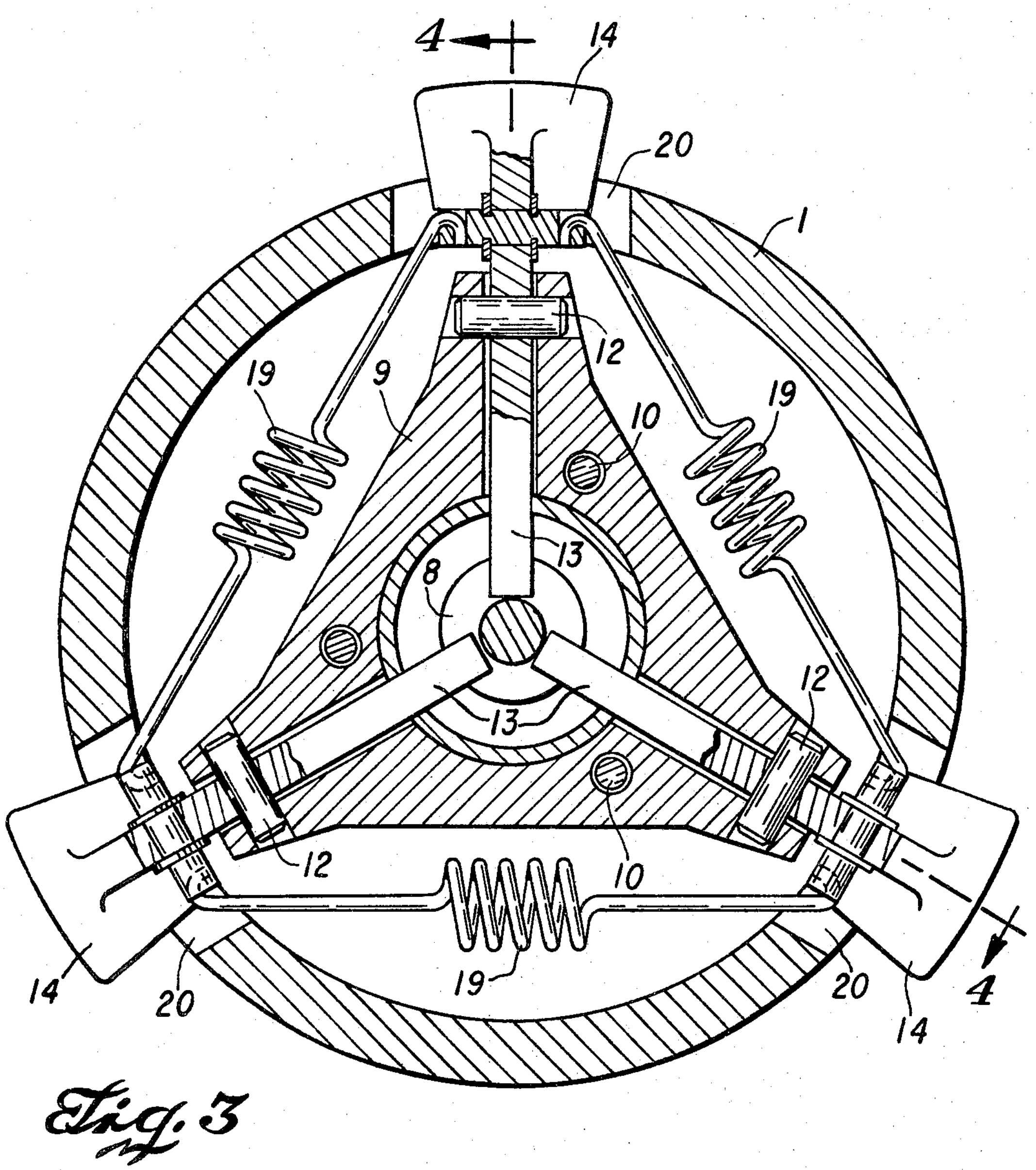
FIGURE 3 is a cross-section plan view of the invention.

Referring now to FIGURE 1, for overall perspective and to FIGURE 2 for the parts layout, a cylindrical housing 1 or hub forms the external surface of the reel holding knob. The front edge of the housing 1 is chamfered as at 23 to permit ease of alignment when a reel is brought into the proximity of the housing, and the rear surface of the housing is formed into a flange 2 having its front surface perpendicular to the cylindrical surface of the housing 1. This perpendicular front surface of flange 2 provides a reference surface against which a reel rests when attached to the reel holding knob. Situated adjacent to the perpendicular front surface of flange 2 and attached thereto, is a ring of frictional material 3 having the same inside and outside diameters as does the flange 2. Due to its location between the reference surface and the reel, the frictional material substantially increases the torque transmittal to the reel.

A coupling sleeve 4 is affixed to the rear of the housing 1, its axis being co-axial with that of the housing. The coupling sleeve 4 is provided for attaching the reel support knob to a drive means for supplying motive power to the reel support knob.

The housing 1 has a cylindrical, coaxial, cutout 21 in its front surface, and a plurality of smaller holes 22 positioned on a diameter which is somewhat larger than the diameter of cutout 21. Secured within the cutout is a bushing 5 which is made of a suitable plastic material and whose inner surface has a lubricating quality. Placed within the bushing so that it will slide in an axial direction is a cylindrical push button 6 having an extended shaft 7, said shaft having an annular groove 8 near its lower end. Securing the push button 6 and the bushing 5 to the housing 1 is a spider 9 attached to the housing 1 by bolts 10 (of which only one is shown in FIGURE 2) passing through holes 22 in the housing. Also attached to the spider 9 are Y-shaped holding arms 11 which are pivotally mounted at the extremities of the spider through pins 12. In the described embodiment, three such holding arms are shown, but the invention is not limited to such a number. The leg 13 of the holding arm 11 extending radially inward from pin 12 (the long leg of the Y) forms a lever arm, the end of which rides within the annular groove 8 of push button shaft 7. A pressure foot 14 is part of the holding arm 11 and is fastened at the extremity of the arm nearest the front surface of the housing. Affixed to the inner surface of the pressure foot 14 is a frictional material 15 (such as neoprene rubber). Attached to the holding arm at the extremity nearest the flange of the housing is a pusher foot 16 positioned within slot 20. Near the outer edge of the holding arm 11 is an arcuate slot 17. Fixed within this slot is a sliding pin 18, to which are attached springs 19 on either side of pin 18, said springs extended to a similar pin 18 on each of the other holding arms 11.

Figures 4, 5:
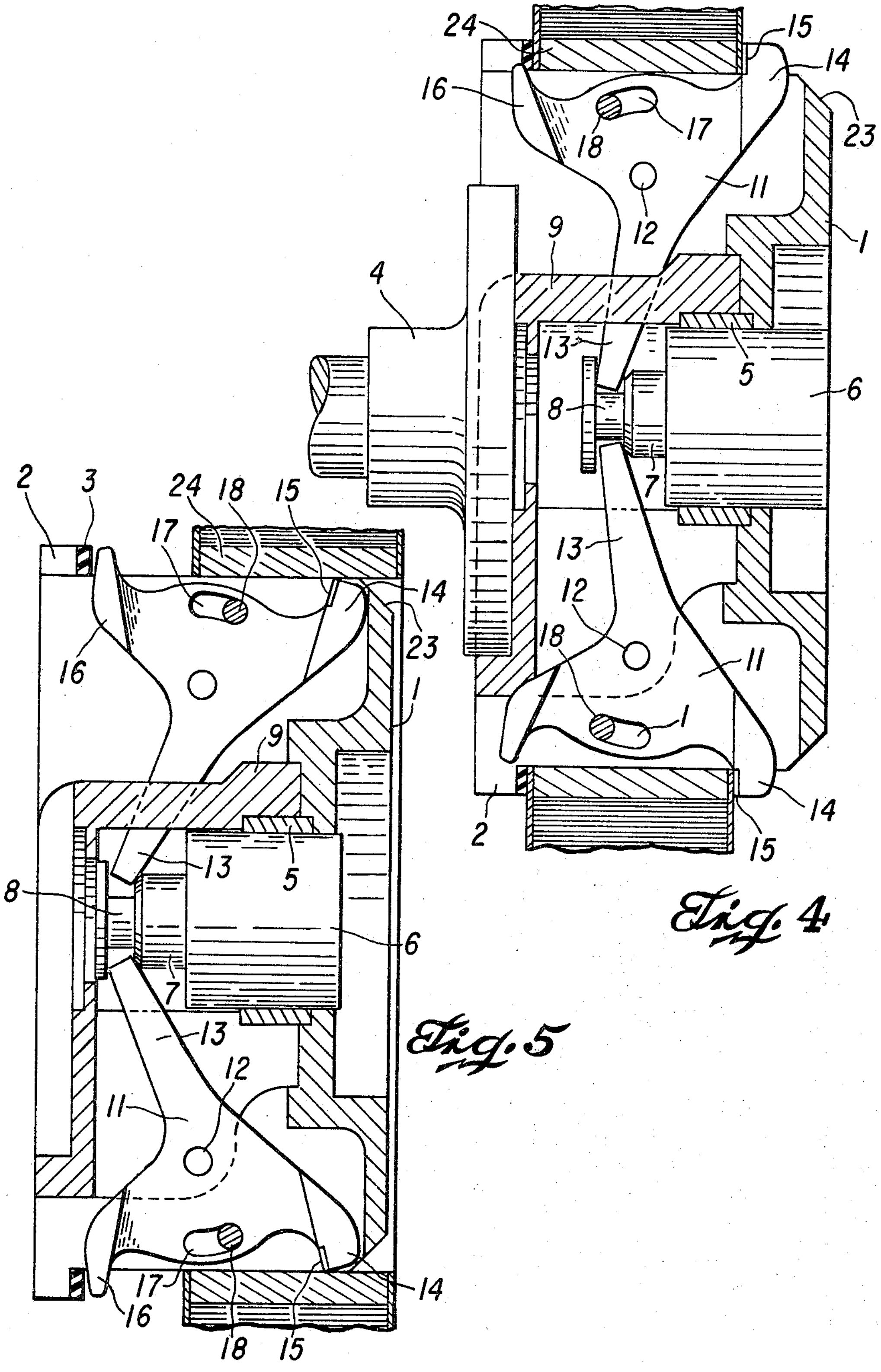
FIGURE 4 is a cross-section view, taken along lines 4—4 of FIGURE 3, showing the reel holding knob in its locked, or reel holding, position and including a reel of tape partially shown thereon.
FIGURE 5 is a cross-section view, taken along lines 4—4 of FIGURE 3, showing the reel holding knob in its unlocked, or reel receiving, position.

The operation of the invention can best be understood by reference to FIGURES 1, 3, 4 and 5. FIGURE 5 shows the reel holding knob in a position to receive a reel 24. Bringing a reel toward the front surface (movement being in an axial direction toward the rear surface of the holding knob), the beveled edge 23 of the front surface will guide the reel up onto the cylindrical outer shell or housing 1 of the knob. Sliding the reel toward the flange at the rear of the housing, said reel will engage pusher feet 16 prior to reaching the flange. Further movement toward the flange and against the pusher feet will cause the holding arms 11 to rotate about pins 12. This rotational movement of the holding arms 11 causes lever arms 13 to move push button 6 in an axial direction outwards from the rear of the holding knob, and causes pressure feet 14 to move radially outward from the surface of the cylindrical housing 1 in a direction towards the outer edge of the reel. As pusher feet 16 are forced fully into the slots 20 in the rear flange 2, the rear surface of the reel resting against the frictional coating 3 on the front surface of the flange 2, push button 6 will be in its outward extended position and the frictional surfaces of pressure feet 14 will be perpendicular to the axis of the tape reel. When the holding arms 11 have rotated to the position shown in FIGURE 4, sliding pins 18 will have moved to the opposite side of the arcuate slots 17 and the force from springs 19 will cause a torque about pins 12 (in a counterclockwise direction about the upper pin in the drawing and clockwise about the lower pin), thus causing pressure feet 14 to exert a rearward pressure on the outer surface of the reel. Pressure being applied to the reel by pressure feet 14 and the rear surface of the reel being held fixed by flange 2, and both surfaces being coated with a frictional material, a large driving torque is transmitted through the holding knob to the reel. The maximum torque which can be transmitted without slippage is described by the following equation:

$$\text{Maximum torque}=2\mu PNR$$

where:

$\mu$=coefficient of friction of friction material
$P$=force applied at each pressure foot
$N$=number of holding arms
$R$=radial distance from axis of holding knob to outer edge of pressure foot.

The importance of the arcuate slot to this driving torque should be here noted. Referring to FIGURES 4 and 5 for this purpose, note first that the amount of torque about pin 12, and consequently the force P in the above equation, is directly proportional to the perpendicular distance between the force line from pin 18 (due to springs 19) and the center of pin 12. Thus the greater the perpendicular distance, and the greater the force P, the greater the maximum torque which can be transmitted to the reel. Because of the curvature of the slot 17 and the force acting on pin 18 from springs 9, the pin will move from one side of the slot to the other as the movement of the holding arm 11 causes the pin to pass beyond a radial line extending through the center of pin 12 from the axis of the holding knob. Thus a sort of torque multiplication is effected by the arcuate slot by increasing the lever arm length about pin 12 more than the distance moved by the holding arm 11. Stated another way, were it not for the arcuate slot (i.e. if the pin 18 were fixed to holding arm 11), to achieve the same torque about pin 12 as just described would require a much greater travel by the push button 6 and the holding arm 11, a greater locking and unlocking force would also be required except for the advantage gained by the self actuating force resulting when the pin slides from one side of the slot to the other.

In releasing the reel, the holding knob changes from the configuration shown in FIGURE 4 to that shown in FIGURE 5. The operation is as follows: Pressure on push button 6 will cause it to move in an axial direction toward the rear of the holding knob. Consequently a force is applied to lever arms 13 causing holding arms 11 to move axially around pin 12 in a direction opposite to that described above for locking the reel on the holding knob. This movement causes pressure feet 14 to release their pressure and begin to move backwards into the hub and away from the reel. At the same time pusher feet 16 are moving out of the slots 20 in flange 2 exerting pressure against the reel from the rear. As the push button 6 reaches the end of its travel, sliding pins 18 move to the opposite side of the arcuate slots 17, and the force due to the tension in springs 19 imparts an additive torque about pins 12 to the holding arms 11. This additional torque about pins 12 creates an additional force at each of the pusher feet 16 against the back surface of the reel, thus forcing the reel outward on the cylindrical surface of the housing 1 and away from the flange 2. For lightweight reels, the type usually encountered, the force of pusher feet 16 is adequate to completely discharge the reel from the holding knob. In its unlocked position, springs 19 will hold the mechanism in its unlocked position until a new reel is placed upon the holding knob.

It is to be understood that the form of my invention, herewith shown and described, is to be taken as a preferred example of the same, and that various changes in the shape, size and arrangement of parts may be ressorted to without departing from the spirit and scope of the invention as defined by the appended claims.

What is claimed is:

1. A reel holding and supporting device comprising:
(a) a hub for providing radial support to a reel, said hub having a raised flange at its rear and a plurality of slots from the rear of said flange to the front of said hub;
(b) reel releasing means positioned within said hub for activating release of said reel;
(c) a plurality of members pivotally positioned within said slots, each of said members moving about a pivot point in radial planes;
(d) a first extremity on said member positioned in front of said flange and movable back into said slot by the action of a reel pushed onto said hub and against said flange;
(e) a second extremity of said member positiond within said slot at the front of said hub which is moved up and toward said flange to clamp the front surface of said reel when said first extremity is moved into said slot;
(f) a third extermity extending radially toward the center of said hub adapted to move said reel releasing means into position for activation; and
(g) tension means connected between said members, said tension means acting at a point slightly forward of said pivot point when said reel is unlocked from said hub and slightly back of said pivot point when said reel is locked on said hub.

2. The device of claim 1 further including sliding pins positioned through each of said members, said tension means being connected to said sliding pins, the travel of each of said pins increasing the lever arm, and thus the torque, about said pivot point.

3. The device of claim 1 which said tension means are tension springs.

4. The device of claim 1 wherein a frictional material is attached to the reel facing surface of said flange and to the reel facing surface of said second extremity to increase the torque which can be transmitted to said reel.

5. The device of claim 1 in which said reel releasing device is located within the central portion of said hub and moves axially forward to said position for activation accessible to an operator desiring to effect a release of the reel.

References Cited

UNITED STATES PATENTS

| | | | |
|---|---|---|---|
| 2,983,460 | 5/1961 | Wright | 242—68.3 |
| 3,124,319 | 3/1964 | Cohen et al. | 242—68.3 |
| 3,307,797 | 3/1967 | McFeaters et al. | 242—68.3 |

FRANK J. COHEN, *Primary Examiner.*